United States Patent
Wang et al.

(10) Patent No.: US 11,641,030 B2
(45) Date of Patent: May 2, 2023

(54) SOLID-STATE ELECTROLYTE, SOLID-STATE BATTERY INCLUDING THE ELECTROLYTE, AND METHOD OF MAKING THE SAME

(71) Applicant: Samsung Electronics Co., Ltd., Suwon-si (KR)

(72) Inventors: Yan Wang, Brookline, MA (US); Lincoln Miara, Lincoln, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 134 days.

(21) Appl. No.: 17/139,023

(22) Filed: Dec. 31, 2020

(65) Prior Publication Data
US 2022/0166053 A1   May 26, 2022

Related U.S. Application Data

(60) Provisional application No. 63/118,439, filed on Nov. 25, 2020.

(51) Int. Cl.
| | |
|---|---|
| *H01M 10/0562* | (2010.01) |
| *H01M 10/0525* | (2010.01) |
| *H01M 4/66* | (2006.01) |
| *H01M 4/134* | (2010.01) |
| *H01M 4/131* | (2010.01) |
| *H01M 4/1391* | (2010.01) |
| *H01M 4/36* | (2006.01) |
| *H01M 4/04* | (2006.01) |
| *H01M 4/1395* | (2010.01) |
| *H01M 4/02* | (2006.01) |

(52) U.S. Cl.
CPC ..... *H01M 10/0562* (2013.01); *H01M 4/0471* (2013.01); *H01M 4/131* (2013.01); *H01M 4/134* (2013.01); *H01M 4/1391* (2013.01); *H01M 4/1395* (2013.01); *H01M 4/364* (2013.01); *H01M 4/661* (2013.01); *H01M 4/667* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 7,824,806 B2 | 11/2010 | Visco et al. | |
| 10,522,873 B2 | 12/2019 | Yushin et al. | |
| 2017/0133712 A1* | 5/2017 | Mimura | H01M 10/0562 |

FOREIGN PATENT DOCUMENTS

| | | |
|---|---|---|
| DE | 102015111806 A1 | 1/2017 |
| WO | 2019052648 A1 | 3/2019 |

OTHER PUBLICATIONS

Akhmetzyanov et al, Electric Properties of the Solid Electrolyte Li14Cr2N8O, vol. 29 Issue 11 Elektrokhimiya 1360-61 (Year: 1993).*

* cited by examiner

*Primary Examiner* — Yoshitoshi Takeuchi
(74) *Attorney, Agent, or Firm* — Cantor Colburn LLP (57) ABSTRACT

A solid-state ion conductor includes a compound of Formula 1:

$$\text{Li}_{16+(5-n)\cdot a-(2+m)\cdot b}\text{M}_{2-a}\text{X}^n{}_a\text{N}_8\text{O}_{1-b}\text{A}^m{}_b \quad \text{Formula 1}$$

wherein, in Formula 1, M is Ta, Nb, V, or a combination thereof, X is an element having an oxidation state of n, wherein n is +1, +2, +3, +4, or a combination thereof, A is an element having an oxidation state of m, wherein m is −1, −2, or a combination thereof, and 0<a≤2 and 0≤b≤1.

24 Claims, 5 Drawing Sheets

SOLID-STATE ELECTROLYTE, SOLID-STATE BATTERY INCLUDING THE ELECTROLYTE, AND METHOD OF MAKING THE SAME

CROSS-REFERENCE TO RELATED APPLICATION

This application claims priority to U.S. Provisional Patent Application No. 63/118,439, filed on Nov. 25, 2020, in the United States Patent and Trademark Office, and all the benefits accruing therefrom under 35 U.S.C. § 119, the content of which is incorporated herein in its entirety by reference.

FIELD

Disclosed is a solid-state ion conductor, a component for a lithium battery including the solid-state ion conductor, a negative electrode including the solid-state ion conductor, a separator for a lithium battery including the solid-state ion conductor, a lithium battery including the solid-state ion conductor, and a method of preparing the solid-state ion conductor.

BACKGROUND

Lithium metal batteries can offer improved specific energy and energy density, and in some configurations improved power density. There has been increased focus on using lithium metal as a negative electrode to improve the energy density of solid state lithium batteries. However, the lithium conductivity of available solid-state electrolytes is significantly less than liquid alternatives. Furthermore, available solid-state electrolytes that have high ionic conductivity (e.g., greater than 1 millisiemen per centimeter) are not suitably stable in the presence of lithium metal. In addition, to provide improved safety, a material which provides improved stability to air would be desirable.

Thus there remains a need for an improved solid-state lithium electrolyte, and a method of preparing the same.

SUMMARY

A solid-state ion conductor comprises a compound of Formula 1:

$$Li_{16+(5-n)\cdot a-(2+m)\cdot b}M_{2-a}X^n{}_aN_8O_{1-b}A^m{}_b \qquad \text{Formula 1}$$

wherein, in Formula 1, M is Ta, Nb, V, or a combination thereof, X is an element having an oxidation state of n, wherein n is +1, +2, +3, +4, or a combination thereof, A is an element having an oxidation state of m, wherein m is 1, 2, or a combination thereof, and $0<a\leq 2$ and $0\leq b\leq 1$.

A component of a lithium secondary electrochemical cell comprises a current collector; and the solid-state ion conductor on the current collector.

A negative electrode comprises a negative active material comprising lithium metal, a lithium metal alloy, or combination thereof; and the solid-state ion conductor on the negative active material.

A separator for a lithium battery comprises a substrate; and the solid-state ion conductor disposed on a surface of the substrate.

An electrochemical cell comprises a positive electrode; a negative electrode; and an electrolyte between the positive electrode and the negative electrode, wherein at least one of the negative electrode or the electrolyte comprise the solid-state ion conductor.

A method of preparing the solid state ion conductor comprises contacting a lithium compound, a compound comprising Ta, Nb, V, or a combination thereof, a compound comprising an element having an oxidation state of +1, +2, +3, +4, or a combination thereof, and a compound comprising an element having an oxidation state of 1, 2, or a combination thereof to provide a mixture; and treating the mixture to prepare the compound.

A method of manufacturing an electrochemical cell comprises providing a negative electrode comprising lithium, a lithium alloy, or combination thereof; disposing the solid-state ion conductor on the negative electrode; disposing an electrolyte on the negative electrode; and disposing a positive electrode on the electrolyte to manufacture the electrochemical cell.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

A solid-state lithium battery includes a negative electrode, a positive electrode, and a solid-state electrolyte between the negative electrode and the positive electrode. It is understood that the positive electrode could alternatively be referred to as a cathode, and the negative electrode as an anode. A negative electrode active material of interest is lithium metal for its high theoretical capacity and low voltage. Similarly, a positive electrode active material of interest is high-voltage nickel-manganese-cobalt oxide (NMC) for its high capacity and promise for high volumetric energy density when used in a battery. Solid-state electrolytes have been studied for use with lithium metal negative electrodes in all-solid-state batteries. However, interposing a solid-state electrolyte between a lithium negative electrode and an NMC-based positive electrode poses a number of engineering challenges, including avoiding elemental interdiffusion between the positive electrode and solid-state electrolyte and volume changes that effect the mechanical integrity of the solid electrolyte-positive electrode interface.

Lithium oxides have been considered for use in a solid state electrolyte. However, available compounds, such as lithium tantalum oxynitride ($Li_{16}Ta_2N_8O$), have been previously shown to exhibit low ionic conductivity, and thus such materials have so far been impractical for use in lithium batteries. Without wishing to be bound by theory it is believed that this is due to lithium ions becoming trapped at the $N_4$ or $N_3O$ tetrahedral sites in $Li_{16}Ta_2N_8O$. Thus, a lithium ion conductor having improved ionic conductivity is desired.

The present inventors have unexpectedly discovered that particular lithium oxynitrides can provide improved lithium conductivity, specifically at room temperature (e.g., at 23° C.), and can provide improved stability towards lithium metal. The disclosed materials can be used to provide an improved lithium metal battery. The disclosed materials can further provide improved stability to air or moisture and can provide improved safety and stability, such as reduced likelihood of a short-circuit from a lithium metal dendrite.

Accordingly, an embodiment of the present disclosure is a solid-state ion conductor comprising a compound of Formula 1:

$$Li_{16+(5-n)\cdot a-(2+m)\cdot b}M_{2-a}X^n{}_aN_8O_{1-b}A^m{}_b \qquad \text{Formula 1}$$

wherein, in Formula 1, M is Ta, Nb, V, or a combination thereof, X is an element having an oxidation state of n, wherein n is +1, +2, +3, +4, or a combination thereof, A is an element having an oxidation state of m, wherein m is −1, −2, or a combination thereof, and $0 < a \le 2$ and $0 \le b \le 1$.

In an embodiment in Formula 1, M can be Ta, Nb, or a combination thereof. In a specific embodiment, M can comprise Ta. In an embodiment, X can comprise, for example, Hf, Zr, Ti, Ge, Sn, Si, Ga, La, Y, Sc, In, Al, Ca, Ba, Mg, Na, K, or a combination thereof, preferably Hf, Zr, Ti, Si, or a combination thereof. In an embodiment, n in Formula 1 can be +3, and X can be, for example, Ga, La, Y, Sc, In, Al, or a combination thereof. In an embodiment, n in Formula 1 can be +4, and X can be, for example, Ge, Zr, Ti, Sn, Si, or a combination thereof. In an embodiment, A can comprise F, Cl, Br, S, Se, or a combination thereof. In some embodiments, a in Formula 1 can be $0 < a \le 0.5$, or $0 < a \le 0.25$, or $0 < a \le 0.1$. In some embodiments, a in Formula 1 can be $1 < a \le 2$, or $1.5 < a \le 2$, or $1.75 < a \le 2$. In some embodiments, a=0. In some embodiments, a=2. In some embodiments, b in Formula 1 can be $0 \le b \le 0.5$, or $0 \le b \le 0.25$, or $0 \le b \le 0.1$. In some embodiments, b=0. In a specific embodiment, a=2, b=0, and X comprises Hf, Zr, Ti, Si, or a combination thereof, and M preferably comprises Ta.

The solid-state ion conductor comprising the compound of Formula 1 can have an ionic conductivity equal to or greater than of $1\times10^{-7}$ siemens per centimeter (S/cm), at 23° C. For example, the solid-state ion conductor comprising the compound of Formula 1 may have an ionic conductivity of $1\times10^{-6}$ S/cm to $1\times10^{-2}$ S/cm, $1\times10^{-6}$ S/cm to $1\times10^{-1}$ S/cm $1\times10^{-5}$ S/cm to $5\times10^{-2}$ S/cm, or $1\times10^{-4}$ S/cm to $1\times10^{-2}$ S/cm, at 25° C. Ionic conductivity may be determined by a complex impedance method at 20° C., further details of which can be found in J. M. Winand et al., "Measurement of Ionic Conductivity in Solid Electrolytes," Europhysics Letters, vol. 8, no. 5, p. 447-452, 1989, the content of which is incorporated herein by reference in its entirety.

In a specific embodiment, the solid-state ion conductor may comprise, but is not limited to, at least one of $Li_{49}Ta_5HfN_{24}O_3$, $Li_{51}Ta_4Hf_2N_{24}O_3$, $Li_{51}Ta_3Hf_3N_{24}O_3$, $Li_{52}Ta_2Hf_4N_{24}O_3$, $Li_{53}TaHf_5N_{24}O_3$, $Li_{18}Hf_2N_8O$, $Li_{18}Ti_2N_8O$, $Li_{18}Si_2N_8O$, $Li_{18}Sn_2N_8O$, $Li_{18}Sn_2N_8O$, $Li_{18}Ge_2N_{80}$, $Li_{17}TaGeN_8O$, $Li_{17}TaZrN_8O$, $Li_{17}TaTiN_8O$, $Li_{17}TaSnN_8O$, $Li_{17}TaSiN_8O$, $Li_{18}Zr_2N_8O$, $Li_{18}Sn_2N_8O$, $Li_{18}Si_2N_8O$, $Li_{18}Ge_2N_8O$, $Li_{15}Ti_2N_8O$, $Li_{18}TaGaN_8O$, $Li_{18}TaLaN_8O$, $Li_{18}TaYN_8O$, $Li_{18}TaScN_8O$, $Li_{18}TaInN_8O$, or $Li_{18}TaAlN_8O$.

The solid-state ion conductor may have a porosity of 0% (no pores) to less than 25%, based on a total volume of the solid-state ion conductor. The porosity may be, for example, 0% to less than 25%, 1% to 20%, 5% to 15%, or 7% to 12%, based on a total volume of the solid-state ion conductor. The porosity of solid-state ion conductor may be determined by scanning electron microscopy, the details of which can be determined by one of skill in the art without undue experimentation. Alternatively, porosity may be determined using nitrogen isotherms as disclosed in E. P. Barrett, L. G. Joyner, P. P. Halenda, "The determination of pore volume and area distributions in porous substances. I. Computations from nitrogen isotherms," J. Am. Chem. Soc. (1951), 73,373-380, the details of which can be determined by one of skill in the art without undue experimentation.

A method for the manufacture of the solid-state ion conductor represents another embodiment of the present disclosure. The method includes contacting a lithium compound, a compound comprising Ta, Nb, V, or a combination thereof, a compound comprising an element having an oxidation state of +1, +2, +3, +4, or a combination thereof, and a compound comprising an element having an oxidation state of 1, 2, or a combination thereof to provide a mixture; and treating the mixture to prepare the compound.

Treating of the precursor mixture can comprise mechanochemically milling the precursor mixture. For example, treating the precursor mixture can be by ball milling using zirconia balls in a stainless steel container. The mechanochemical milling can be conducted under an inert atmosphere, such as argon, nitrogen, helium, or a combination thereof.

Treating of the precursor mixture may alternatively or additionally comprise heat treating the precursor mixture at a temperature of, for example, 25° C. to 800° C. For example, the heat-treating may comprise heat-treating the precursor mixture at a temperature of 25° C. to 800° C., 100° C. to 775° C., 200° C. to 750° C., or 300° C. to 700° C., preferably under an inert atmosphere. An inert atmosphere can be provided by any suitable inert gas, with non-limiting examples including argon, nitrogen, helium, or a combination thereof. The heat-treating can be for a time effective to provide the compound according to Formula 1, for example 20 to hours, or 25 to 150 hours, or 30 to 140 hours, or 30 to 100 hours, or 30 to 50 hours.

The disclosed method provides a solid-state ion conductor having desirable ionic conductivity and stability against lithium metal. The disclosed method can also provide a cost-effective method of making the solid-state ion conductor. In an embodiment, the solid-state ion conductor of Formula 1 does not form an alloy or compound when contacted with lithium metal. Stated another way, the solid-state ion conductor comprising the compound of Formula 1 does not react with lithium metal and the solid-state ion conductor is stable when in contact with lithium metal. In an aspect, in a phase diagram containing lithium metal and the compound of Formula 1, lithium metal and the compound of Formula 1 are directly connected by a tie-line, with no compounds therebetween.

The solid-state ion conductor comprising the compound of Formula 1 can be disposed on a surface of a substrate. The composition comprising the solid-state ion conductor may be disposed on the surface of the substrate using any suitable means, for example, using tape casting, slurry casting, screen printing, or by pressing the solid-state ion conductor on to a surface of a substrate. Additional details of tape casting and screen printing, for example suitable binders and solvents, can be determined by one of skill in the art without undue experimentation. Alternatively, the solid-state ion conductor may be disposed on the substrate by sputtering using a sputtering target comprising the compound of Formula 1.

In an aspect, the substrate is a current collector. The current collector may comprise, for example, at least one of nickel, copper, titanium, stainless steel, or amorphous carbon. In an embodiment, the current collector can comprise amorphous carbon.

Another aspect of the present disclosure is a negative electrode. The negative electrode comprises a negative active material and the solid-state conductor comprising the compound of Formula 1 disposed on a surface of the negative active material.

The negative active material may comprise a carbon, such as a hard carbon, soft carbon, carbon black, ketjen black, acetylene black, activated carbon, carbon nanotubes, carbon fiber, graphite, or an amorphous carbon. Also usable are lithium-containing metals and alloys, for example a lithium alloy comprising Si, Sn, Sb, or Ge. Lithium-containing metal oxides, metal nitrides, and metal sulfides are also useful. In particular, the use of Ti, Mo, Sn, Fe, Sb, Co, and V is mentioned, such as in $Li_4Ti_5O_{12}$. Also useable are phosphorous (P) or metal doped phosphorous (e.g., $NiP_3$). The negative active material is not limited to the foregoing and any suitable negative active material can be used. The compound of Formula 1 may be disposed on a surface of the negative active material by sputtering, for example. Use of lithium metal as the negative active material is mentioned.

In an embodiment, the negative electrode may further comprise a binder. The binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the negative active material.

In an embodiment, the substrate may be a separator for a lithium battery. The solid-state ion conductor comprising the compound of Formula 1 may be disposed on a surface of the substrate. The substrate may be any suitable material. For example, the substrate may comprise a polymer such as nylon, polyester, polyethylene, polypropylene, poly(tetrafluoroethylene), or polyvinyl chloride, a ceramic such as $TiO_2$ or yttria stabilized zirconia, or a glass such as a borosilicate glass. A combination comprising at least one of the foregoing may be used. Also, the substrate may have any suitable form, and may be nonwoven or woven material, or in the form of a film, e.g., a microporous film. Use of microporous polyethylene, microporous polypropylene, or a composite thereof is mentioned. The compound of Formula 1 may be disposed on a surface thereof, e.g. on an exterior surface, or on an interior surface, such as in a pore of the substrate.

The solid-state ion conductor disclosed herein can be incorporated into an electrochemical cell, specifically a lithium battery. Thus, another aspect of the present disclosure is a lithium battery comprising a positive electrode; a negative electrode; and an electrolyte between the positive electrode and the negative electrode, wherein at least one of the negative electrode and the electrolyte comprise the compound of Formula 1. In an aspect the negative electrode may comprise lithium, a lithium alloy, or a combination thereof.

The positive electrode can be prepared by forming a positive active material layer including a positive active material on a current collector. The current collector may comprise aluminum, for example. The positive electrode may be prepared by screen printing, slurry casting, or powder compression of the positive active material on the current collector to provide the positive electrode. However, the method of preparing the positive electrode is not limited thereto, and any suitable method may be used.

The positive active material can comprise a lithium transition metal oxide, or a transition metal sulfide. For example, the positive active material can be a compound represented by any of the Formulas: $Li_aAl_{1-b}M_bD_2$ wherein $0.90 \le a \le 1.8$ and $0 \le b \le 0.5$; $Li_aE_{1-b}M_bO_{2-c}D_c$ wherein $0.90 \le a \le 1.8$, $0 \le b \le 0.5$, and $0 \le c \le 0.05$; $LiE_{2-b}Mb_{4-c}D_c$ wherein $0 \le b \le 0.5$ and $0 \le c \le 0.05$; $Li_aNi_{1-b-c}Co_bM_cD_\alpha$ wherein $0.90 \le a \le 1.8$, $0 \le b \le 0.5$, $0 \le c \le 0.05$, and $0 \le \alpha \le 2$; $Li_aNi_{1-b-c}C_bM_cO_{a-\alpha}X_\alpha$ wherein $0.90 \le a \le 1.8$, $0 \le b \le 0.5$, $0 \le c \le 0.05$, and $0 \le a \le 2$; $Li_aNi_{1-b-c}CO_bM_2O_{2-\alpha}X_2$ wherein $0.90 \le a \le 1.8$, $0 \le b \le 0.5$, $0 \le c \le 0.05$, and $0 \le a \le 2$; $Li_aNi_{1-b-c}Mn_bM_cD_\alpha$ wherein $0.90 \le a \le 1.8$, $0 \le b \le 0.5$, $0 \le c \le 0.05$, and $0 \le \alpha \le 2$; $Li_aNi_{1-b-c}Mn_bMeO_{2-\alpha}X_a$ wherein $0.90 \le a \le 1.8$, $0 \le x \le 0.5$, $0 \le c \le 0.05$, and $0 < \alpha < 2$; $Li_aNi_{1-b-c}Mn_bM_cO_{2-\alpha}X_2$ wherein $0.90 \le a \le 1.8$, $0 \le b \le 0.5$, $0 \le c \le 0.05$, and $0 \le \alpha \le 2$; $Li_aNi_bE_cG_dO_2$ wherein $0.90 \le a \le 1.8$, $0 \le b \le 0.9$, $0 \le c \le 0.5$, and $0.001 \le d \le 0.1$; $Li_aNi_b Co_cMn_dG_bO_2$ wherein $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ wherein $0.90 \le a \le 1.8$ and $0.001 \le b \le 0.1$; $Li_aCoGbO_2$ wherein $0.90 \le a \le 1.8$ and $0.001 \le b \le 0.1$; $Li_aM_nG_bO_2$ where $0.90 \le a \le 1.8$ and $0.001 \le b \le 0.1$; $LiaMn2GbO_4$ wherein $0.90 \le a \le 1.8$ and $0.001 \le b \le 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ $(0 \le f \le 2)$; $Li_{(3-f)}Fe_2(PO_4)_3$ wherein $0 \le f \le 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where $0 \le x \le 1$, $LiNi_{1-x-y}Co_xMn_yO_2$ where $0 \le x \le 0.5$ and $0 \le y \le 0.5$, $LiFePO_4$, $TiS_2$, $FeS_2$, $TiS_3$, and $FeS_3$. For example, the positive active material can include a composite oxide of lithium and a metal selected from cobalt, manganese, and nickel. Mentioned are NMC 811 ($LiNi_{0.8}Mn_{0.1}Co_{0.1}O_2$), NMC 622 ($LiNi_{0.6}Mn_{0.2}Co_{0.2}O_2$), NMC 532 ($LiNi_{0.5}Mn_{0.3}Co_{0.2}O_2$), and NCA ($LiNi_{0.8}Co_{0.15}Al_{0.05}O_2$).

The positive active material layer may further include a conductive agent and a binder. Any suitable conductive agent and binder may be used.

A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

In an embodiment, the compound according to Formula 1 can be disposed between the positive and negative electrodes and can serve as a solid electrolyte. In an aspect, the solid electrolyte may serve as a separator to electrically insulate the positive electrode from the negative electrode. In some embodiments, the compound according to Formula 1 can be disposed on a substrate or a separator in the lithium battery. Suitable substrates can be as described above. In some embodiments, other electrolytes, including liquid electrolytes or other solid-state electrolytes can be excluded from the lithium battery of the present disclosure.

In an embodiment, the negative electrode comprises lithium metal, a lithium metal alloy, or combination thereof. In an embodiment, the compound of Formula 1 is directly on the negative electrode.

Figure 1:
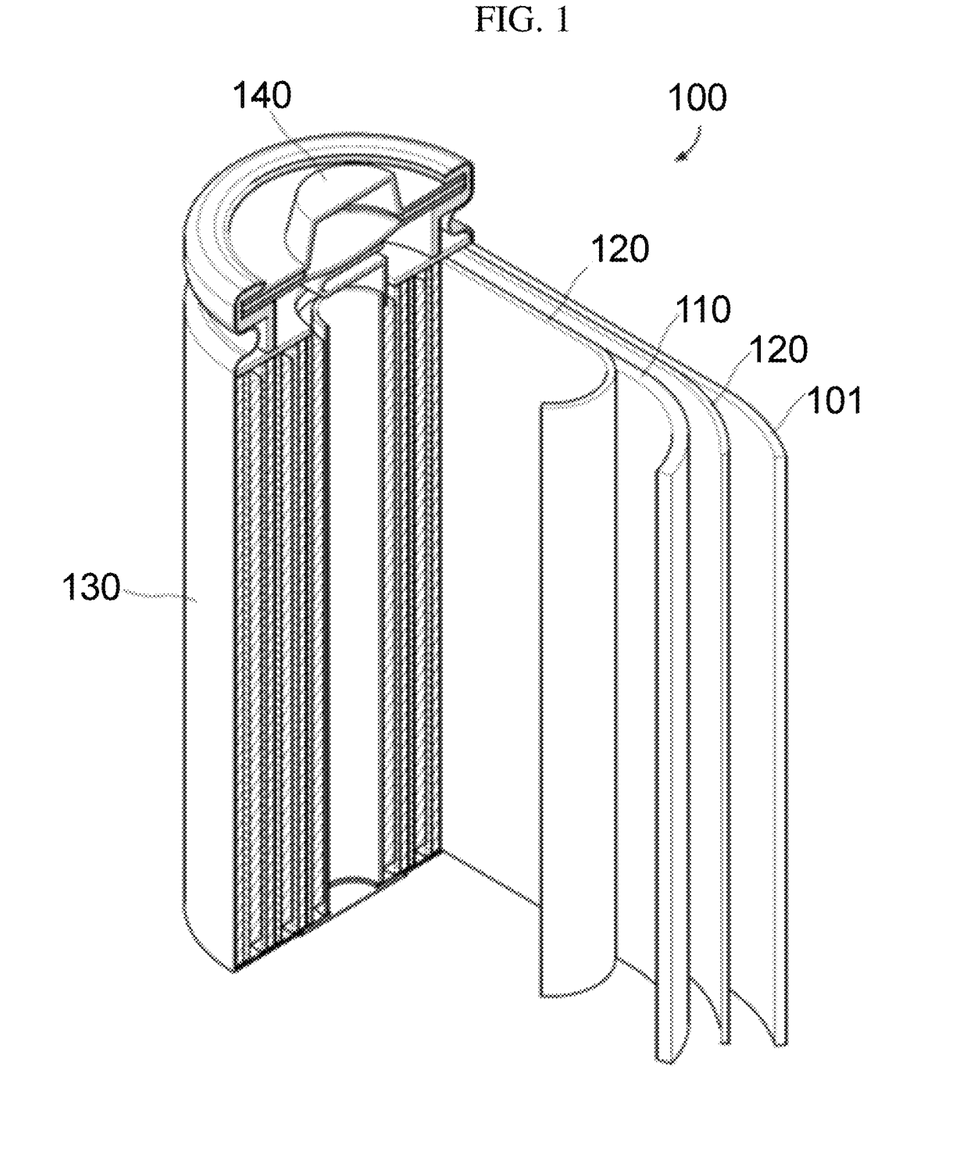
FIG. 1 is a schematic diagram of an embodiment of a lithium battery.

A schematic diagram of a lithium battery is provided in FIG. 1. As shown in the battery 100 of FIG. 1, the negative electrode 101 can be used in combination with a positive electrode 110 and an electrolyte layer 120 can be provided between the positive electrode and the negative electrode. The battery of FIG. 1 may comprise the solid-state ion conductor of the present disclosure. The negative electrode 101 or an electrolyte layer 120 can each independently comprise the compound of Formula 1. Mentioned is use of an electrolyte layer comprising the compound of Formula 1. Also mentioned is use of a negative electrode for 101 comprising the compound of Formula 1.

Figure 2:
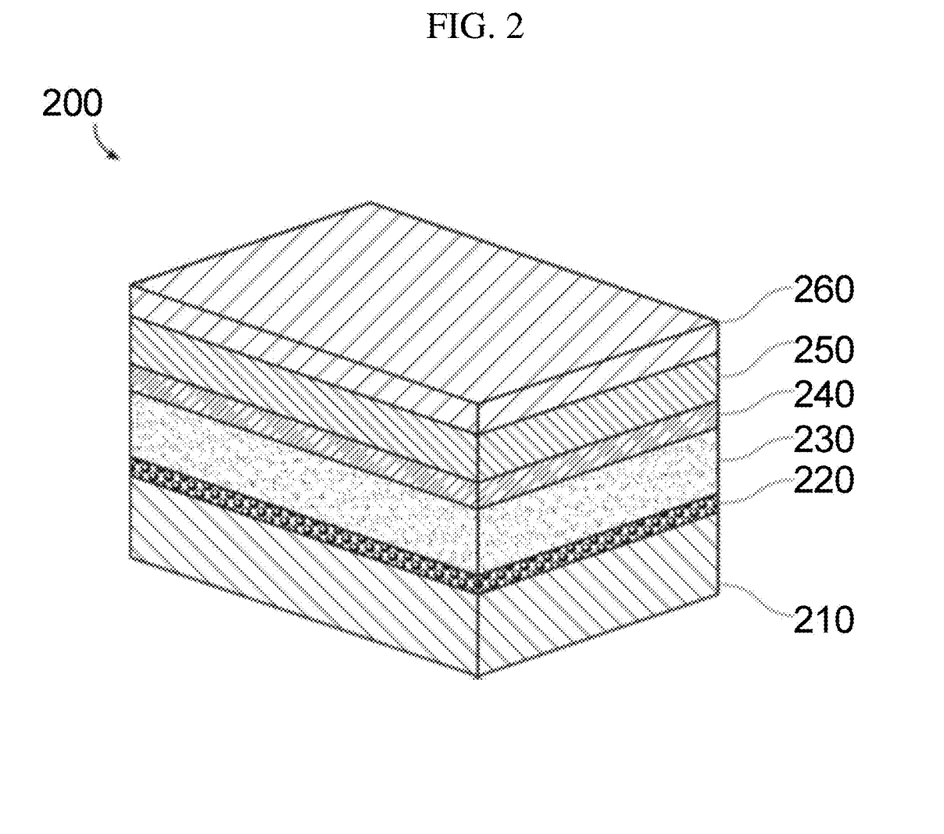
FIG. 2 is a schematic diagram of an embodiment of a lithium battery.

As shown in FIG. 2, a battery 200 may comprise a substrate 230 on a solid-state electrolyte layer 240. The substrate or the solid-state electrolyte layer 240 may each independently comprise the compound according to Formula 1. Also shown in FIG. 2 is a positive electrode current collector 210, a positive electrode 220 comprising the positive active material, a negative electrode 250, and a negative electrode current collector 260. In an aspect, the substrate may be omitted and the solid-state electrolyte layer 240 may be suitable to electrically separate the negative electrode 250 and the positive electrode 220.

Figure 3:
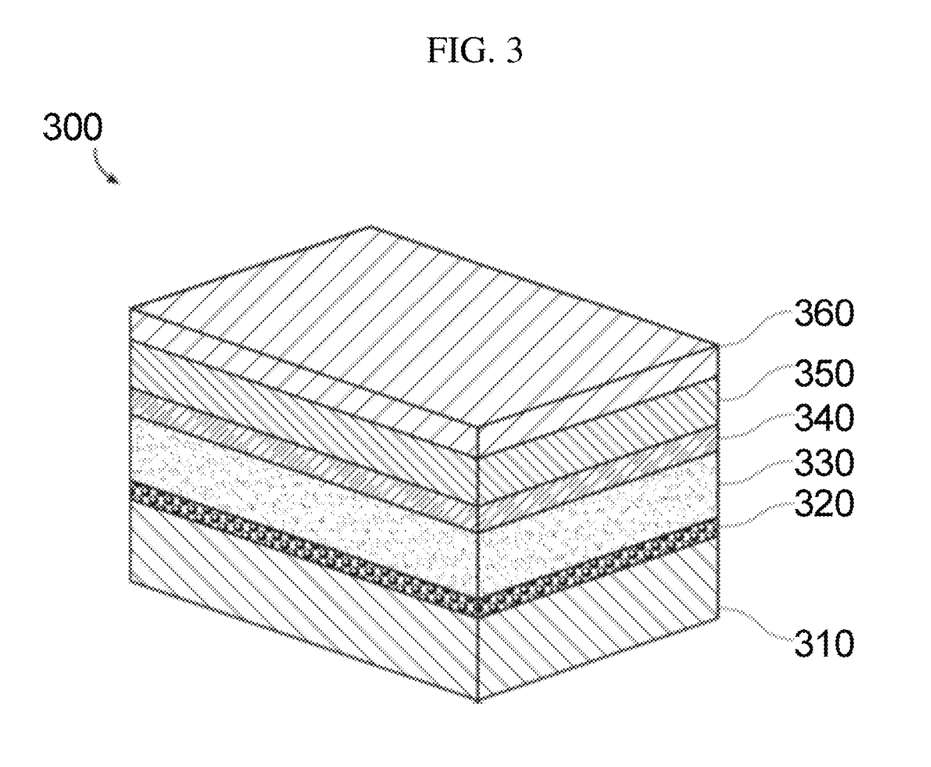
FIG. 3 is a schematic diagram of an embodiment of a lithium battery.

In an aspect, the solid ion conductor comprising the compound of Formula 1 can be useful as a negative active material protection layer. The negative active material protection layer, when present, can be disposed on the negative electrode and adjacent to a solid electrolyte. For example, as shown in FIG. 3, a battery 300 may comprise a solid electrolyte 330 adjacent to a negative active material protection layer 340 comprising the solid-state ion conductor including the compound according to Formula 1. Also shown in FIG. 3 is a positive electrode current collector 310, a positive electrode 320 comprising the positive electrode active material, a negative electrode 350, and a negative electrode current collector 360.

When present, the solid electrolyte in the solid electrolyte layer may be, for example, an inorganic solid electrolyte. The solid electrolyte in the solid electrolyte layer may be, for example, at least one of an oxide-containing solid electrolyte or a sulfide-containing solid electrolyte.

Examples of the oxide-containing solid electrolyte may include at least one of $Li_{1+x+y}Al_xTi_{2-x}Si_yP_{3-y}O_{12}$ (where $0 \leq x \leq 2$ and ($Ky \leq 3$), $BaTiO_3$, $Pb(ZraTi_{1-a})O_3$ (PZT) (where 1), $Pb_{1-x}La_xZr_{1-y}Ti_yO_3$ (PLZT) (where $0 \leq x \leq 1$ and $Y \leq y < 1$), $Pb(Mgi_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0 \leq x \leq 2$ and $0 \leq y \leq 3$), $Li_xAl_yTi_z(PO_4)_3$ (where $0 \leq x \leq 2$, $0 \leq y \leq 1$, and $0 < z < 3$), $Li_{1+x+y}(Al_aGa_{1-a})_x(Ti_bGe_{1-b})_{2-x}Si_yP_{3-y}O_{12}$ (where $0 \leq x \leq 1$, $0 \leq y \leq 1$, and ($0 \leq b \leq 1$), $Li_xLa_yTiO_3$ (where $0 < x < 2$ and $0 < y < 3$), $Li_2O$, $LiOH$, $Li_2CO_3$, $LiAlO_2$, $Li_2O$—$Al_2O_3$—$SiO_2$—$P_2O_5$—$TiO_2$—$GeO_2$, and $Li_{3+x}La_3M_2O_{12}$ (where M is Te, Nb, or Zr, and $0 \leq x \leq 10$). Also mentioned is $Li_7La_3Zr_2O_{12}$ (LLZO) or $Li_{3+x}La_3Zr_{2-a}M_aO_{12}$ (e.g., M-doped LLZO, where M is Ga, W, Nb, Ta, or Al, and $0 \leq x \leq 10$ and ($0 \leq x < 2$).

In an embodiment, the solid electrolyte may be a sulfide-containing solid electrolyte. Examples of the sulfide-containing solid electrolyte may include at least one of $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_r$, (where m and n each are a positive number, Z represents any of Ge, Zn, and Ga), $Li_2S$—$GeS_2$, $Li_2S$—$SiS_2$—$Li_3PO_4$, $Li_2S$—$SiS_2$-$Li_pMO_q$ (where p and q each are a positive number, M represents at least one of P, Si, Ge, B, Al, Ga, or In), $Li_{7-x}PS_{6-x}Cl_x$ (where $0 \leq x \leq 2$), $Li_{7-x}PS_{6-x}Br_x$ (where $0 \leq x \leq 2$), or $Li_{7-x}PS_{6-x}I_x$ (where $0 \leq x \leq 2$).

Also, the sulfide-containing solid electrolyte may include at least sulfur (S), phosphorus (P), and lithium (Li), as component elements among the sulfide-containing solid electrolyte materials. For example, the sulfide-containing solid electrolyte may be a material including $Li_2S$—$P_2S_5$. Here, when the material including $Li_2S$—$P_2S_5$ is used as a sulfide-containing solid electrolyte material, a mixing molar ratio of $Li_2S$ and $P_2S_5$ ($Li_2S:P_2S_5$) may be, for example, selected in a range of about 50:50 to about 90:10.

For example, the sulfide-containing solid electrolyte may include an argyrodite-type solid electrolyte represented by Formula 2:

Formula 2

In Formula 2, A is at least one of P, As, Ge, Ga, Sb, Si, Sn, Al, In, Ti, V, Nb, or Ta, X is at least one of S, Se, or Te, Y is at least one of Cl, Br, I, F, CN, OCN, SCN, or $N_3$, and 0Kx2. The sulfide-containing solid electrolyte may be an argyrodite-type compound including at least one of $Li_{7-x}PS_{6-x}Cl_x$ (where $0 \leq x \leq 2$), $Li_{7-x}PS_{6-x}Br_x$ (where $0 \leq x \leq 2$), or $Li_{7-x}PS_{6-x}I_x$ (where $0 \leq x \leq 2$). Particularly, the sulfide-containing solid electrolyte in the solid electrolyte layer may be an argyrodite-type compound including at least one of $Li_6PS_5Cl$, $Li_6PS_5Br$, or $Li_6PS_5I$.

The solid electrolyte may be prepared by a sintering method, by melting and quenching starting materials (e.g., $Li_2S$ or $P_2S_5$), or by mechanical milling. The solid electrolyte may be amorphous or crystalline. A mixture may be used.

The solid electrolyte layer may, for example, include a binder. Examples of the binder in the solid electrolyte layer may include styrene butadiene rubber (SBR), polytetrafluoroethylene, polyvinylidene fluoride, or polyethylene, but embodiments are not limited thereto, and any suitable binder may be used. The binder of the solid electrolyte may be the same as or different from a binder of the cathode active material layer and the first anode active material layer.

The solid electrolyte comprising the oxide-containing solid electrolyte or the sulfide-containing solid electrolyte may be further included in the positive active material layer, if desired.

The lithium battery can be manufactured by providing a positive electrode, providing a negative electrode, and disposing the solid-state ion conductor comprising the compound according to Formula 1 between the positive electrode and the negative electrode. The method can optionally further comprise disposing a separator between the positive and the negative electrodes. For example, the lithium battery can be manufactured by sequentially laminating the negative electrode, the solid-state ion conductor comprising the compound according to Formula 1, and the positive electrode; winding or folding the laminated structures, then enclosing the wound or folded structure in a cylindrical or rectangular battery case or pouch to provide the lithium battery.

This disclosure is further illustrated by the following examples, which are non-limiting.

EXAMPLES

Table 1 shows the phase stability of $Li_{16+(5-n)a}Ta_{2-a}M^{n+}{}_aN_8O$ with M=Hf n=4. Specifically, Table 1 shows the calculated energy above hull as a measure of the phase stability for doping the structure.

TABLE 1

| Composition | Energy above hull (meV/atom) |
| --- | --- |
| $Li_{16}Ta_2N_8O$ | 8.9 |
| $Li_{49}Ta_5HfN_{24}O_3$ | 10.3 |
| $Li_{50}Ta_4Hf_2N_{24}O_3$ | 9.9 |
| $Li_{51}Ta_3Hf_3N_{24}O_3$ | 9.3 |
| $Li_{52}Ta_2Hf_4N_{24}O_3$ | 6.1 |
| $Li_{53}TaHf_5N_{24}O_3$ | 2.4 |
| $Li_{18}HfN_8O$ | 0 |

Figure 4:
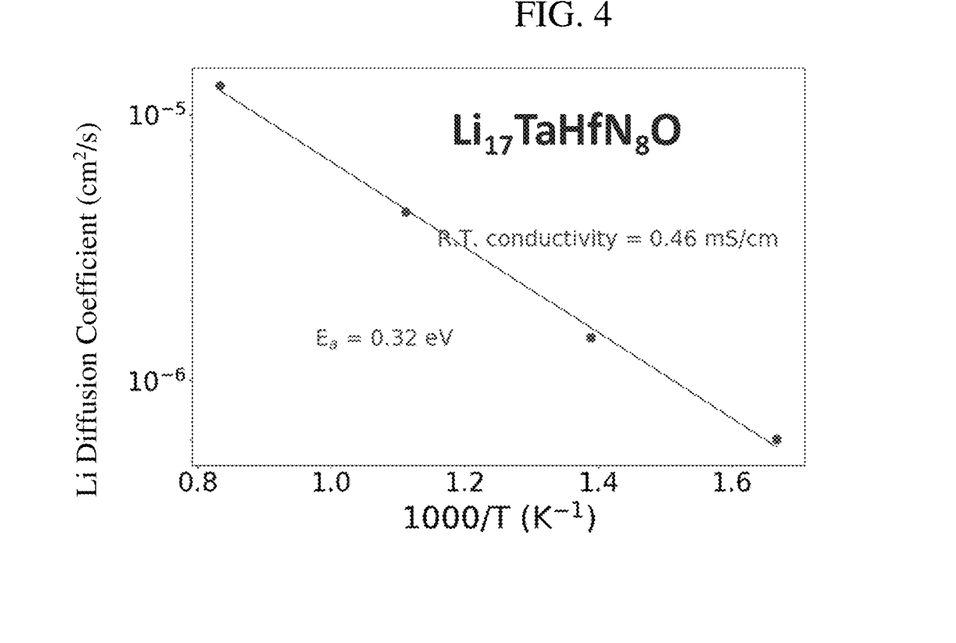
FIG. 4 is an Arrhenius plot and is a graph of the diffusion coefficient of lithium (D, cm$^2$/s) versus inverse temperature (1000/T, K$^{-1}$), which illustrates the ionic conductivity of $Li_{17}TaHfN_8O$, at room temperature.
Figure 5:
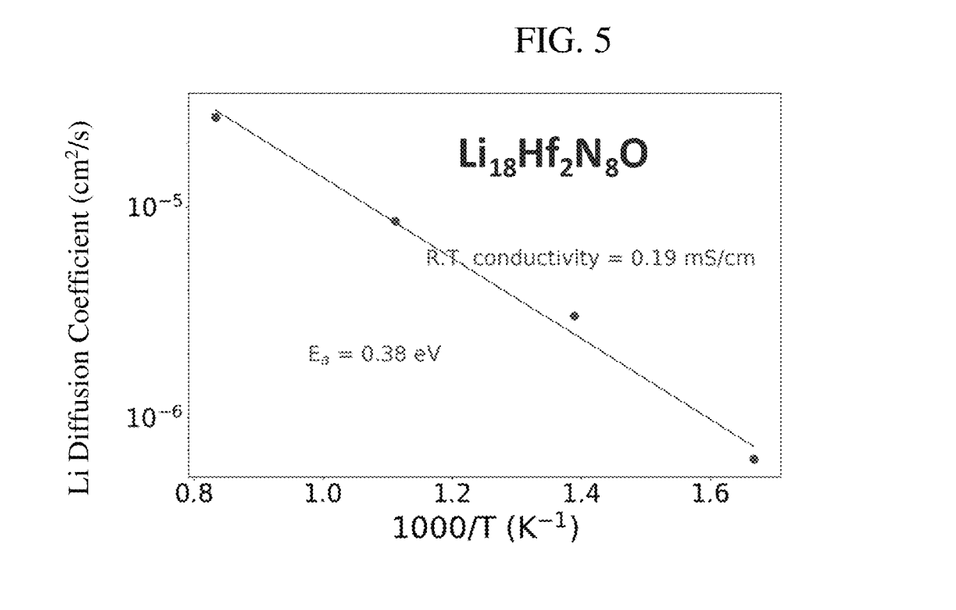
FIG. 5 is an Arrhenius plot and is a graph of the diffusion coefficient of lithium (D, cm$^2$/s) versus inverse temperature (1000/T, K$^{-1}$), which illustrates the ionic conductivity of $Li_{18}HfN_8O$, at room temperature.

The data shown in Table 1 indicates that Hf can be doped to up to a=2 with an energy above hull of less than 50 meV/atom. The ionic conductivity of $Li_{17}TaHfN_8O$ and $Li_{18}Hf_2N_{80}$ was determined using ab-initio molecular dynamics calculation using the Vienna Ab initio Simulation Package. Relevant parameters of the calculation include a projector augmented wave potentials with a kinetic energy cutoff of 400 eV, the exchange and correlation functionals of Perdew-Burke-Ernzerhof generalized gradient (GGA-PBE), and picoseconds simulation time with a time step of 2 femtosecond. The results are shown in FIGS. 4 and 5, respectively. As shown, $Li_{17}TaHfN_8O$ and $Li_{18}Hf_2N_8O$, respectively, have high ionic conductivities at room temperature (e.g., greater than 0.1 mS/cm) of 0.46 mS/cm and 0.19 mS/cm.

Table 2 shows the phase stability of $Li_{16+(5-n)a}Ta_{2-a}M^{n+}{}_aN_8O$ with M=Ge, Zr, Ti, Sn, Si and n=4.

TABLE 2

| Composition | Energy above hull (meV/atom) |
| --- | --- |
| $Li_{16}Ta_2N_8O$ | 8.9 |
| $Li_{17}TaGeN_8O$ | 10.9 |
| $Li_{17}TaZrN_8O$ | 13.1 |
| $La_{17}TaTiN_8O$ | 18.3 |
| $Li_{17}TaSnN_8O$ | 0 |
| $Li_{17}TaSiN_8O$ | 22.1 |
| $Li_{18}Zr_2N_8O$ | 4.9 |
| $Li_{18}Sn_2N_8O$ | 0 |
| $Li_{18}Si_2N_8O$ | 15.9 |
| $Li_{18}Ge_2N_8O$ | 5.0 |
| $Li_{18}Ti_2N_8O$ | 19.5 |

Figure 6:
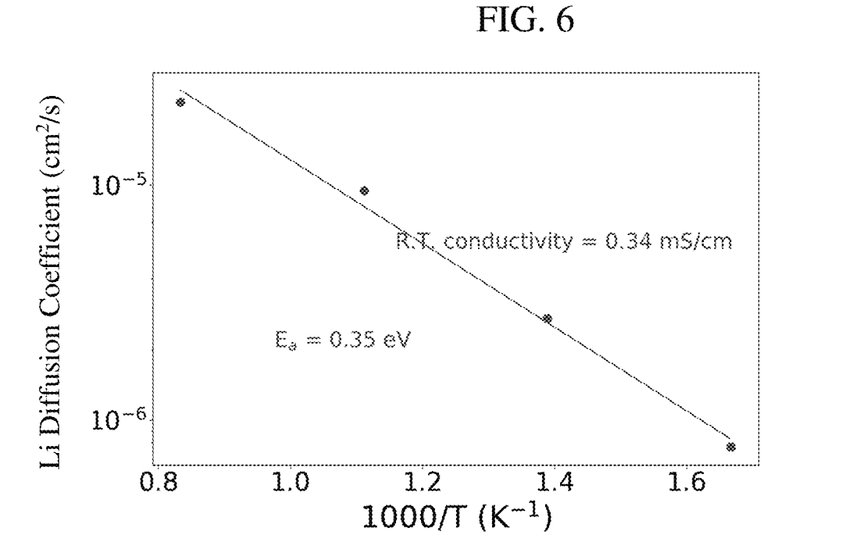
FIG. 6 is an Arrhenius plot and is a graph of the diffusion coefficient of lithium (D, cm$^2$/s) versus inverse temperature (1000/T, K$^{-1}$), which illustrates the ionic conductivity of $Li_{18}Zr_2N_8O$, at room temperature.

FIG. 6 shows that $Li_{18}Zr_2N_8O$ exhibits high ionic conductivity after Zr substitution.

Electrochemical stability for $Li_{18}M_2N_8O$ (M=Hf, Ti, Si, Zr, Sn, Ge) was calculated and the results are shown in Table 3. As can be seen from Table 3, almost all of the compounds tested were observed to be stable at 0V against Li metal. Extended stability windows were also observed which, without wishing to be bound by theory, is believed to be passivated by decomposition into non-electronically conductive interface.

TABLE 3

| Composition | Intrinsic stability window | Decomposition product at Li metal potential (0 V vs. Li/Li$^+$) | Extended stability window |
| --- | --- | --- | --- |
| $Li_{18}Hf_2N_8O$ | [0, 0.48 V] | Stable | [0, 1.68 V] |
| $Li_{18}Ti_2N_8O$ | [0, 0.48 V] | Stable | [0, 1.68 V] |
| $Li_{18}Si_2N_8O$ | [0, 0.48 V] | Stable | [0, 1.68 V] |
| $Li_{18}Zr_2N_8O$ | [0, 0.48 V] | Stable | [0, 1.68 V] |
| $Li_{18}Sn_2N_8O$ | [0.38, 0.60 V] | $Li_{17}Sn_4$ | [0.38, 0.69 V]* |
| $Li_{18}Ge_2N_8O$ | [0.20, 0.48 V] | $Li_{15}Ge_4$ | [0.20, 1.68 V] |

*metal Sn form > 0.69 V

Table 4 shows the phase stability of $Li_{16+(5-n)a}Ta_{2-a}M^{n+}{}_aN_8O$ with M=Ga, La, Y, Sc, In, Al and n=3.

TABLE 4

| Composition | Energy above hull (meV/atom) |
| --- | --- |
| $Li_{16}Ta_2N_8O$ | 8.9 |
| $Li_{18}TaGeN_8O$ | 42.7 |
| $Li_{18}TaLaN_8O$ | 66.2 |
| $Li_{18}TaYN_8O$ | 67.0 |
| $Li_{18}TaScN_8O$ | 52.7 |
| $Li_{18}TaInN_8O$ | 48.5 |
| $Li_{18}TaAlN_8O$ | 48.0 |

The data in Table 4 shows that Ga, In and Al can be doped up to a=1 with an energy above hull of less than 50 meV/atom.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation state" as used herein is a formalism used to describe a hypothetical charge that an atom would have if all bonds to atoms of different elements were 100% ionic, with no covalent component.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A solid-state ion conductor comprising a compound of Formula 1:

$$Li_{16+(5-n)\cdot a-(2+m)\cdot b}M_{2-a}X^n{}_aN_8O_{1-b}A^m{}_b \quad \text{Formula 1}$$

wherein, in Formula 1,

M is Ta, Nb, V, or a combination thereof,

X is an element having an oxidation state of n, wherein n is +1, +2, +3, or +4, and wherein X is Hf, Zr, Ti, Ge, Sn, Si, Ga, La, Y, Sc, In, Al, Ca, Ba, Mg, Na, K, or a combination thereof, A is an element having an oxidation state of m, wherein m is −1, −2, or a combination thereof, and $0<a\leq 2$ and $0\leq b\leq 1$.

2. The solid-state ion conductor of claim 1, wherein M comprises Ta.

3. The solid-state ion conductor of claim 1, wherein X is Hf, Zr, Ti, Si, or a combination thereof.

4. The solid-state ion conductor of claim 1, wherein n is +3.

5. The solid-state ion conductor of claim 4, wherein X is Ga, La, Y, Sc, In, Al, or a combination thereof.

6. The solid-state ion conductor of claim 1, wherein n is +4.

7. The solid-state ion conductor of claim 6, wherein X is Ge, Zr, Ti, Sn, Si, or a combination thereof.

8. The solid-state ion conductor of claim 1, wherein A is F, Cl, Br, S, Se, or a combination thereof.

9. The solid-state ion conductor of claim 1, a=2 and b=0.

10. The solid-state ion conductor of claim 1, having an ionic conductivity of greater than $1\times 10^{-7}$ Siemens per centimeter at room temperature.

11. The solid-state ion conductor of claim 10, having an ionic conductivity of $1\times 10^{-6}$ to $1\times 10^{-2}$ Siemens per centimeter at room temperature.

12. A component of a lithium secondary electrochemical cell comprising:

a current collector; and the solid-state ion conductor of claim 1 on the current collector.

13. The component of claim 12, wherein the current collector comprises at least one of nickel, copper, titanium, stainless steel, or amorphous carbon.

14. The component of claim 12, wherein the solid-state ion conductor is in a form of a layer on the current collector.

15. A negative electrode comprising:

a negative active material comprising lithium metal, a lithium metal alloy, or combination thereof; and the solid-state ion conductor of claim 1 on the negative active material.

16. A separator for a lithium battery comprising:
a substrate; and
the solid-state ion conductor of claim 1 disposed on a surface of the substrate.

17. An electrochemical cell comprising:
a positive electrode;
a negative electrode; and
an electrolyte between the positive electrode and the negative electrode,
wherein at least one of the negative electrode or the electrolyte comprise the solid-state ion conductor of claim 1.

18. The electrochemical cell of claim 17,
wherein the negative electrode comprises lithium metal, a lithium metal alloy, or combination thereof, and
wherein the solid-state ion conductor is between the positive electrode and the negative electrode.

19. The electrochemical cell of claim 18, wherein the compound of Formula 1 is directly on the negative electrode.

20. A method of preparing the compound of claim 1, the method comprising:
contacting a lithium compound, a compound comprising Ta, Nb, V, or a combination thereof, a compound comprising an element having an oxidation state of +1, +2, +3, or +4, and a compound comprising an element having an oxidation state of 1, −2, or a combination thereof to provide a mixture; and
treating the mixture and forming the compound of claim 1.

21. The method of claim 20, wherein treating the mixture comprises mechanochemical milling of the mixture to prepare a compound of Formula 1.

22. The method of claim 20, wherein the treating is heat-treating the mixture at 25° C. to 800° C. to prepare the compound of Formula 1.

23. The method of claim 22, wherein the heat-treating comprises heating from 300° C. to 700° C. in an inert gas.

24. A method of manufacturing an electrochemical cell, the method comprising:
providing a negative electrode comprising lithium, a lithium alloy, or combination thereof;
disposing the solid-state ion conductor of claim 1 on the negative electrode;
disposing an electrolyte on the negative electrode; and
disposing a positive electrode on the electrolyte to manufacture the electrochemical cell.

* * * * *